United States Patent Office 3,126,291
Patented Mar. 24, 1964

3,126,291
HYDRAULIC CEMENT COMPOSITION
Ellis Gray King and Carl Adolphson, Bellingham, Wash., assignors, by mesne assignments, to Georgia-Pacific Corporation, a corporation of Georgia
No Drawing. Filed Apr. 22, 1960, Ser. No. 23,922
24 Claims. (Cl. 106—90)

This invention relates to hydraulic cement compositions such as concrete or mortar and has particular reference to such compositions or mixes containing additives which improve the strength properties of structures made from such compositions.

This application is a continuation-in-part of our co-pending applications Serial No. 433,794, filed June 1, 1954, on "Process of Improving the Effectiveness of the Components of Spent Sulfite Liquor and the Products Thereof," now abandoned; Serial No. 539,542, filed October 10, 1955, on "Process of Improving the Effectiveness of the Components of Spent Sulfite Liquor and the Products Thereof," now Patent No. 2,935,504, and Serial No. 815,294, filed May 25, 1959, on "Drilling Fluid Composition and Process," now Patent No. 2,935,473. Those applications disclose novel dispersing agents including salts of sulfonated lignin-containing materials such as spent sulfite liquor, the salts having a cation selected from the group consisting of iron, aluminum, chromium, copper and mixtures thereof, as well as such salts of oxidized lignosulfonates, and oxidized lignosulfonate per se. The present invention relates to the use of these dispersing agents as indurating additives or as components of indurating compositions for addition to hydraulic cement.

Sulfonated lignin-containing materials such as spent sulfite liquor products have been extensively used in the manufacture and use of cement. Fermented spent sulfite liquor solids or "residuum solids of fermented spent sulfite liquor" (MacPherson Patent No. 2,435,594) comprise a well known type of such products and are disclosed in said patent as useful in indurating compositions for additives to concrete or mortar mixes.

The primary object of the present invention is to provide sulfonated lignin-containing additives and compositions superior to those heretofore used in plasticizing and improving strengths in cement or concrete structures.

Another important object of the present invention is to provide sulfonated lignin-containing indurating additives which are highly effective, yet which are economical to produce from abundantly available raw materials such as spent sulfite liquor.

A further object of this invention is to provide a concrete having compressive strengths at early as well as late stages in the setting thereof.

Other objects and advantages of the present invention it is believed will be readily apparent from the following detailed description of preferred embodiments thereof.

Briefly, this invention comprehends within its scope the discovery that greatly improved indurating additives for concrete and mortar are provided by the use of the water soluble lignosulfonate additives disclosed in said co-pending applications. The sulfonated lignin materials useful in the present invention are fully disclosed in the above-identified applications, the disclosures thereof being incorporated herein by reference. Briefly, these materials comprise: (1) the iron, aluminum, chromium or copper salts, or mixtures of these salts, of sulfonated lignin-containing materials such as those obtained from the pulping of wood and other lignocellulosic material, for example, spent sulfite liquor obtained from the pulping of wood by the neutral and acid bisulfite process, sulfonated kraft process lignin and sulfonated soda lignin; the metal ion of said salts preferably being present in an amount chemically equivalent to 1–50% of the sulfate salt thereof, based on the weight of the sulfonated lignin in the material; (2) oxidized salts of the same categories; and (3) such sulfonated lignin-containing materials which have been oxidized without the formation of the named salts. Oxidation is accomplished by reaction of the sulfonated lignin-containing material or salt thereof with an oxidizing agent having an oxidation power stronger than an oxidation potential of about −1.3, such agents including hydrogen peroxide, ozone, lead dioxide, chromic acid, chlorine, alkali and alkaline earth metal hypochlorites, alkali metal chromate, alkali metal permanganate, alkli metal persulfate, alkali metal perborate, electrolytic oxidation and combinations thereof.

The additives of the present invention are useful in ordinary Portland cement mortars and concretes, i.e., those comprising Portland cement, sand and/or aggregate and gauging water, and can be used in cement, mortar or concrete mixes in conjunction with calcined diatomaceous earth or other pozzolanic materials such as uncalcined diatomaceous earth, calcined diatomaceous shales and clays, volcanic ash, calcined clays and shales, and the like. The mix can also contain, either with or without the pozzolan, one or more of the conventional additives including air-entraining agents such as the long-chain alkyl sulfates, alkyl aryl sulfonates, etc., waterproofing additives such as stearates, stearic acid, oil emulsions and the like; cement setting inhibitors or accelerators, etc.

As little as 0.01% of the additives of the present invention, based on the weight of the cement, can have an effect in improving the strength properties of the cement. An amount greater than about 1% by weight of the cement is not usually commercially practicable and for most purposes smaller amounts produce effective results. The preferred range is between at least about 0.1% and about 0.5% of the lignosulfonate additives of this invention, based on the weight of the cement. The additives are preferably added to the cement mix in the dried powder form, but aqueous solutions thereof can be used if desired. Also, the special lignosulfonate additives can be incorporated into additive mixes comprising blends, for example, of the lignosulfonate, a pozzolan and a cement set accelerator such as calcium chloride or other alkaline earth metal salt.

The following specific examples are illustrative of the present invention, but it is to be understood that the invention is not to be limited to the specific details thereof:

EXAMPLE 1

In carrying out this example, specimens of mortar were prepared and tested for compressive strength in accordance with ASTM C-109, in which one part of Portland cement and 2.75 parts of graded Ottawa sand are used, the water being adjusted to give a flow between 100 and 115, as required by the test specifications. In these tests the additive of the present invention was compared with the conventional fermented spent sulfite liquor solids prepared by fermenting, steam stripping and spray drying the liquor obtained from the calcium bisulfite pulping of soft wood chips. The conventional fermented spent sulfite liquor solids were added to mortar mixes Nos. 1, 2 and 3 in the amounts set forth in the table below.

A typical representative product of our invention and discovery selected as the additive in this experiment was a spray dried iron salt of fermented spent sulfite liquor solids oxidized by sodium dichromate, prepared as follows: Two hundred and nineteen grams of concentrated fermented calcium base spent sulfite liquor having 48% by weight of non-volatile solids was made alkaline to pH 8.0 by adding sodium hydroxide and then digested for 24 hours at 85–90° C. while adding more sodium hydroxide as needed to maintain the pH at 8.0. Next, 18 grams of ferric sulfate (24.5% Fe) and 4 grams of sulfuric acid were added as 25% solutions. The mixture, diluted to about 40% non-volatile solids, was heated to about 60° C. and 8 grams of $Na_2Cr_2O_7 \cdot 2H_2O$ was added with vigorous stirring as a 25% solution. The mixture was heated 1 hour at 85–90° C., centrifuged to remove calcium sulfate, and dried.

The additive thus prepared was added to mortar mixes Nos. 4, 5 and 6 in the amounts set forth in the table.

In the following table are set forth the compressive strength data of the six mixes after aging for 3 days and 28 days. The amounts of additive in the several mixes are set forth in percent by weight, based on the weight of the cement.

*Table*

| Additive Type | Mix No. | Additive, percent by weight | Compressive strength of 2-inch cubes after aging— | |
|---|---|---|---|---|
| | | | 3 days (in pounds) | 28 days (in pounds) |
| Fermented spent sulfite liquor solids | 1 | 0.2 | 11,170 | 20,770 |
| | 2 | 0.3 | 10,800 | 21,330 |
| | 3 | 0.4 | 9,630 | 19,530 |
| Sodium dichromate oxidized iron salt | 4 | 0.2 | ---------- | 23,470 |
| | 5 | 0.3 | 11,630 | 23,670 |
| | 6 | 0.4 | 15,120 | 29,800 |

The test results set forth in the above table clearly illustrate the unexpectedly better strengths obtained with the additive of the present invention (mix Nos. 4, 5 and 6), both at 3 days and at 28 days, as compared to the conventional lignosulfonate additive (mix Nos. 1, 2 and 3). A further wholly unexpected phenomenon is exhibited by the data in that with increasing amounts of the additive of our invention, the strength increases sharply, whereas with the conventional additive, increasing amounts over about 0.2% by weight have no added effect and in fact may be deleterious.

EXAMPLE 2

An effect equivalent to oxidation of the spent sulfite liquor solids by chemicals may be brought about by electrolytic treatment and, whereas the reactions may be deep-seated and involve more than oxidation, the general effect is to bring about the properties found in the oxidized product as already herein described.

A preferred method for carrying out the electrolytic treatment is to start with a fermented calcium base spent sulfite liquor in order to take advantage of the improvements resulting from the removal of sugars by fermentation. This fermented liquor is treated with sodium hydroxide to raise the pH to approximately 8.0 and bring about precipitation of calcium sulfite which is then removed. The sodium hydroxide treatment increases the conductivity of the liquor and also produces a further improvement in the dispersing properties thereof. The liquor was then subjected to electrolysis in the anode compartment of an electrolytic cell at a voltage of 4 to 6 volts.

During the course of electrolysis, the solution became acid, sodium hydroxide collected in the cathode compartment and the current decreased as the liquor conductivity decreased, the product was removed from the anode compartment when the current flow had become extremely low, and the liquor was neutralized to about pH 4 with sodium hydroxide. The solids were brought to dryness and ground to a fine powder.

Another sample of fermented spent sulfite liquor containing 34.7 grams of non-volatile solids was mixed with 3.22 grams of sodium hydroxide in aqueous solution to give a final concentration of 16% total solids by weight and the solution electrolized between platinum electrodes without a diaphragm with 0.276 ampere hour of electricity per gram of spent liquor solids. The electrolysis was conducted at 80° C. A solution containing 10 grams of the electrolysis product solids was mixed with a solution containing 2.5 grams of ferric sulfate (24.5% Fe) to base exchange the iron salt. The resulting iron salt was dried, after removing calcium sulfate.

The product produced by electrolysis was found to be substantially as effective as the product produced by chemical oxidation.

The Portland cement utilized in the examples can be substituted by other hydraulic cements such as aluminous cements. Moreover, while the present invention is particularly directed to concretes and mortars, other types of cement compositions such as, for example, the cement slurries used in the cementing of oil wells are benefited by our additives.

Furthermore it is to be noted that the particular form of compositions shown and described and the particular procedure set forth are presented for purposes of explanation and illustration, and that modifications of said compositions and procedure can be made without departing from our invention as defined in the appended claims.

We claim:

1. A cement composition comprising a hydraulic cement and at least 0.01%, by weight of the cement, of an additive consisting essentially of a water soluble salt of a sulfonated lignin-containing material, said salt having a cation selected from the group consisting of iron, aluminum, chromium, copper and mixtures thereof.

2. The composition of claim 1 wherein said sulfonated lignin-containing material is obtained from spent sulfite liquor.

3. The composition of claim 1 wherein said salt is oxidized.

4. A composition comprising a hydraulic cement and at least 0.01%, by weight of the cement, of an additive consisting essentially of a water soluble salt of spent sulfite liquor, said salt being oxidized with an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and mixtures thereof, said salt having a metal ion selected from the group consisting of iron, aluminum, chromium, copper and mixtures thereof.

5. The composition of claim 4 wherein the salt is present in an amount between about 0.1 and 0.5% by weight.

6. The composition of claim 2 wherein the cation is iron.

7. The composition of claim 3 wherein the oxidation is carried out by electrolytic oxidation.

8. The composition of claim 3 wherein the oxidation is carried out by hydrogen peroxide.

9. The composition of claim 4 wherein the metal ion is iron and the oxidizing agent is an alkali metal chromate.

10. A cement composition comprising a hydraulic cement and at least 0.01%, by weight of the cement, of an additive consisting essentially of a water soluble, oxidized sulfonated lignin-containing material, said material being oxidized with an oxidizing agent having an oxidizing power stronger than an oxidation potential of about —1.3.

11. The composition of claim 10 wherein said sulfonated lignin-containing material is obtained from spent sulfite liquor and wherein said oxidizing agent is selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and mixtures thereof.

12. The composition of claim 4 wherein the metal ion is chromium and the oxidizing agent is an alkali metal chromate.

13. The composition of claim 4 wherein the metal ion is aluminum and the oxidizing agent is hydrogen peroxide.

14. A cement composition comprising a hydraulic cement and at least 0.01%, by weight of the cement, of an additive consisting essentially of a water soluble sulfonated lignin-containing material oxidized by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and mixtures thereof.

15. The composition of claim 3 wherein said sulfonated lignin-containing material is obtained from spent sulfite liquor and wherein said salt is oxidized by electrolytic oxidation.

16. The composition of claim 10 wherein said sulfonated lignin-containing material is obtained from spent sulfite liquor and wherein said spent sulfite liquor is oxidized by electrolytic oxidation.

17. A cement composition comprising a hydraulic cement and at least 0.01%, by weight of the cement, of an additive consisting essentially of a water soluble product prepared by interacting sulfonated lignin-containing material with a metal ion selected from the group consisting of iron, aluminum, chromium, copper and mixtures thereof, said metal ion being present in an amount chemically equivalent to 1–50% of the sulfate salt thereof, based on the weight of the sulfonated lignin in the material.

18. A cement composition comprising a hydraulic cement and at least 0.01%, by weight of the cement, of an additive consisting essentially of a water soluble complex salt of a sulfonated lignin-containing material, said complex salt containing a cation selected from the group consisting of iron, aluminum, chromium, copper and mixtures thereof.

19. A cement composition comprising a hydraulic cement and at least 0.01%, by weight of the cement, of an additive consisting essentially of a product prepared by complexing a sulfonated lignin-containing material with a metal selected from the group consisting of iron, aluminum, chromium, copper and mixtures thereof to produce a water soluble product, said metal being present in an amount chemically equivalent to 1–50% of the sulfate salt thereof, based on the weight of the sulfonated lignin in said material.

20. The composition of claim 6 wherein the iron is present in an amount chemically equivalent to 1–50% of the sulfate salt thereof, based on the weight of the sulfonated lignin solids.

21. A cement composition comprising a hydraulic cement and at least 0.01%, by weight of the cement, of a water soluble additive consisting essentially of sulfonated lignin-containing material in combination with a metal in soluble form selected from the group consisting of iron, chromium, copper, aluminum and mixtures thereof, said metal being present in an amount chemically equivalent to 1–50% of the sulfate salt thereof, based on the weight of the sulfonated lignin in the material.

22. A cement composition comprising a hydraulic cement and at least 0.01%, by weight of the cement, of a water soluble additive consisting essentially of a sulfonated lignin-metal complex, said metal being selected from the group consisting of iron, aluminum, chromium, copper and mixtures, thereof.

23. A cement composition comprising a hydraulic cement and at least 0.01%, by weight of the cement, of a water soluble additive consisting essentially of a soluble sulfonated lignin-containing material and a soluble metal ion selected from the group consisting of iron, aluminum, copper, chromium and mixtures thereof, said metal ion being present in an amount chemically equivalent to 1–50% of the sulfate salt thereof, based on the weight of the sulfonated lignin in the material.

24. The composition of claim 19 wherein said additive is oxidized with an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof.

References Cited in the file of this patent

UNITED STATES PATENTS

| | | |
|---|---|---|
| 750,905 | South | Feb. 2, 1904 |
| 2,169,980 | Scripture | Aug. 15, 1939 |
| 2,549,507 | Morgan et al. | Apr. 17, 1951 |
| 2,935,473 | King et al. | May 3, 1960 |
| 2,935,504 | King et al. | May 3, 1960 |